Feb. 15, 1966 J. H. STREETS 3,235,193

TAPE TRANSPORT

Filed June 27, 1963 4 Sheets-Sheet 1

JOHN H. STREETS
INVENTOR.

BY Robert G. Clay

ATTORNEY

Feb. 15, 1966 J. H. STREETS 3,235,193

TAPE TRANSPORT

Filed June 27, 1963 4 Sheets-Sheet 2

JOHN H. STREETS
INVENTOR.

BY Robert G. Clay

ATTORNEY

Feb. 15, 1966 J. H. STREETS 3,235,193

TAPE TRANSPORT

Filed June 27, 1963 4 Sheets-Sheet 3

JOHN H. STREETS
INVENTOR.

BY Robert S. Clay

ATTORNEY

JOHN H. STREETS
INVENTOR.

BY Robert G. Clay

ATTORNEY

United States Patent Office 3,235,193
Patented Feb. 15, 1966

3,235,193
TAPE TRANSPORT
John H. Streets, Redwood City, Calif., assignor to Ampex Corporation, Redwood City, Calif., a corporation of California
Filed June 27, 1963, Ser. No. 291,137
14 Claims. (Cl. 242—55.12)

This invention relates to tape transports, and particularly to transports in which the tape is guided in a doubled path between a pair of reels.

In the tape transport art, a tape is usually guided by means of guide posts, transducing heads, tension arms, capstans, and other tape-engaging elements that are mounted to project generally perpendicularly from a "top plate" forming the upper side of the transport chassis. Such a plate together with the tape-engaging elements must be machined with extreme accuracy and positioned to close tolerances because variations in the angles or positions of the guide elements can easily cause the tape to leave the desired path, if such angles are incorrect.

The above described construction is generally used in all classes of transports, including the class to which the present invention belongs, in which the tape is guided in a doubled path to make, for example, a helical bend around a broad-band rotary-head scanning assembly. In such configurations previously known, it has been customary to make the doubled path somewhat in the form of an omega, with the tape bent in a direction opposite to the direction of wrap at the shanks of the helical bend. Such a construction definitely requires guides at the shanks projecting at a predetermined angle from the top plate, as described above.

Accordingly, it is an object of the present invention to provide a tape transport of the class in which the tape is guided in a doubled path between the reels, characterized by improved solidity and accuracy in the mounting of the tape-engaging elements.

It is a further object of the present invention to provide a transport as above characterized and capable of being manufactured with less complication and expense.

A transport in accordance with the invention utilizes a helical scanning assembly on which all of the tape engaging elements are solidly mounted in such a way that they all face radially outwardly from the scanning assembly toward the same side of the tape, with the exception of the pinch roller, which must engage the tape on the side opposite from the capstan. Although only one capstan is used, engaging only one portion of the tape, the shanks of the tape in the bend are crossed to define a loop, this configuration being useful to enable the engagement of all the guide elements with only one side of the tape. In addition the reels are mounted, by means of a novel top plate, in strict parallelism with the axis of the scanning assembly.

A better understanding of the invention may be had by reference to the following description, taken in conjunction with the accompanying drawings, in which.

Figure 1:
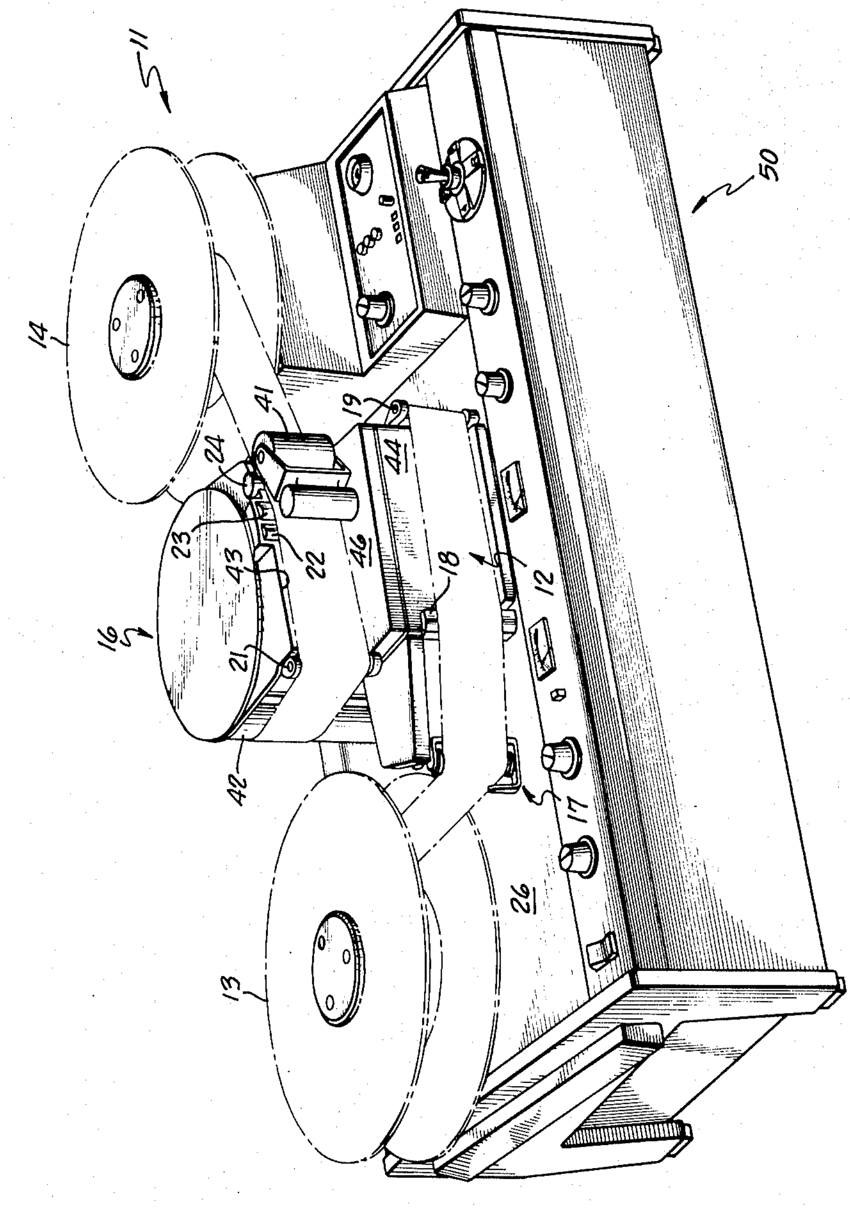
FIGURE 1 is a perspective of a tape transport incorporating the invention.

Referring now to the drawings and particularly to FIGURE 1, there is shown a magnetic tape television signal recording and reproducing machine 11 in which a tape 12 is transported between a supply reel 13 and a takeup reel 14, the tape between the reels making a substantially helical turn about a rotating head scanning assembly 16. Between the reels, the tape must also engage and bend around a tape tension arm 17, an erase head 18, a pair of angled guides 19 and 21, a pair of audio and control track erase and read-write heads 22 and 23, and a capstan 24.

As an important feature of the invention, all of the above named tape engaging elements are solidly mounted on the scanning assembly 16 in such a way that they all face in a direction substantially radially outwardly from the axis of the scanning assembly and toward the same side of the tape, in this case the oxide side of the tape that also engages the rotating heads (not shown) of the scanning assembly 16. This arrangement permits the accurate mounting of these tape engaging elements on a very much smaller and more easily machined member (the scanning assembly) than the top plate 26 of the machine, on which such elements are ordinarily directly mounted. Furthermore it enables the mounting of the heads 18, 22, 23 and the guides 19, 21 with the longest sides thereof directly and solidly backed by and supported on the scanning assembly instead of being extended from the top plate in the manner of a cantilever beam, as was formerly customary in the art. It will be readily understood that the elements named are very much more solidly positioned and the angles of their tape engaging surfaces are very much more permanently and accurately determined with the present arrangement. As a consequence, the tape is more accurately guided in the operation of the machine, and the tolerances that must be met in the manufacturing procedure are considerably less demanding for the same quality of performance, so that a machine of equal performance can be made at less expense.

Figure 2:
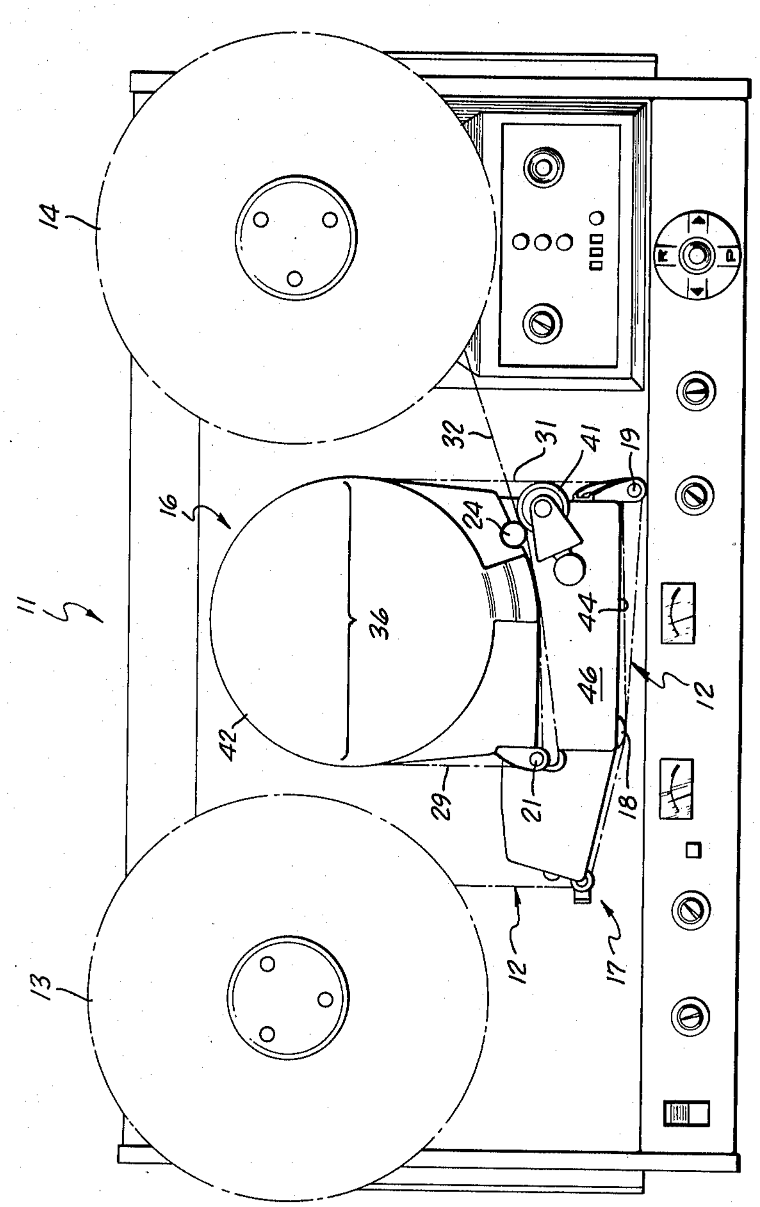
FIGURE 2 is a plan of the apparatus shown in FIGURE 1.

As a concomitant feature of the invenion, useful to permit the engagement of the tape engaging elements all on one side of the tape as above described, the tape is guided in a loop 29, the shanks 31 and 32 of which are crossed as shown in FIGURE 2. It will be seen that there is only one capstan 24, and that it engages only one portion of the length of the tape. Previously in the art, machines have used such a capstan only with the previously mentioned omega-shaped tape path, but never with a full loop having crossed shanks. Full loops have been used only when a single capstan is meant to engage both shanks at the point of crossing so as to drive both the in-going and out-coming portions of the tape loop. The present invention differs from both of these prior devices in using a full loop with crossed shanks, but a capstan that engages and drives only one of the shanks. In the present invention, the crossing of the shanks of the tape loop is dictated by the requirement that the tape be bent at every bending point in the same direction, i.e., to define an interior angle facing the scanning assembly 16, in order that the tape engaging elements may all be mounted on the scanning assembly side of the tape as above described. For example, it will be readily seen that the tape loop 29 must make a bend of at least 180 degrees in passage around the right cylindrical portion 36 of the scanning assembly. If the guides 19 and 21 are to be solidly mounted on the scanning assembly and positioned so that the standard omega shaped tape path configuration is avoided, then it follows that the axis of the supply reel 13 (FIGURE 2) must be located somewhere to the left of the guide 19, and the axis of the takeup reel 14 must be located somewhere to the right of the guide 21 as seen in the figure. Since the reels 13 and 14 are substantially greater in diameter than the scanning assembly 16, it follows that the axis of reel 14 must be located to the right of the axis of reel 13. The most advantageous arrangement meeting these conditions is the one shown in FIGURE 2, involving the crossing of the shanks 31 and 32 of the loop 29.

As a further important feature of the invention, the scanning assembly is shaped to accommodate and solidly mount a pinch roller 41 to engage the tape on the side opposite the capstan 24. This structure of the scanning assembly provides a substantially semi-cylindrical tape guiding surface 42 on one side and a stepped configuration on the other side including an upper level wall 43 and a lower level wall 44 generally parallel to the axis of the semi-cylindrical surface 42. The lower level wall 44 is off-set from the upper level wall 43 in a direction radially away from the axis of the surface 42 and an upper level platform surface 46 is provided normal to the axis of the surface 42 and extending between the walls 43 and 44. The supply reel 13 is mounted at the lower level of the wall 44 while the takeup reel 14 is mounted at the upper level of the wall 43. The tape consequently comes off the supply reel 13 at the lower level, and proceeds in a downstream direction to the tension arm 17, thence to the erase head 18 at the upstream end of the wall 44, thence to the guide 19 at the downstream end of the wall 44, thence at an upward angle and a helical half turn around the surface 42 to the guide 21 at the upstream end of the wall 43, thence across the heads 22, 23, across the capstan 24 and to the takeup reel 14.

Figure 3:
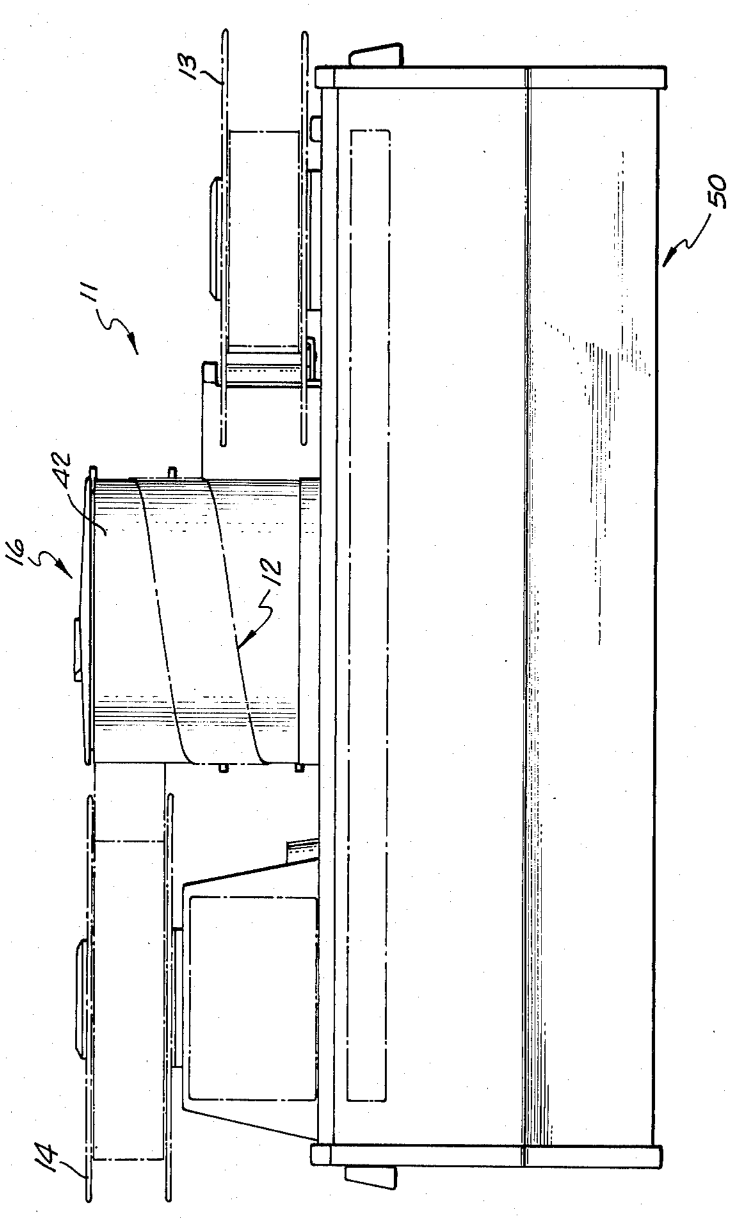
FIGURE 3 is a rear elevation of the apparatus of the figure shown in FIGURES 1 and 2.
Figure 4:
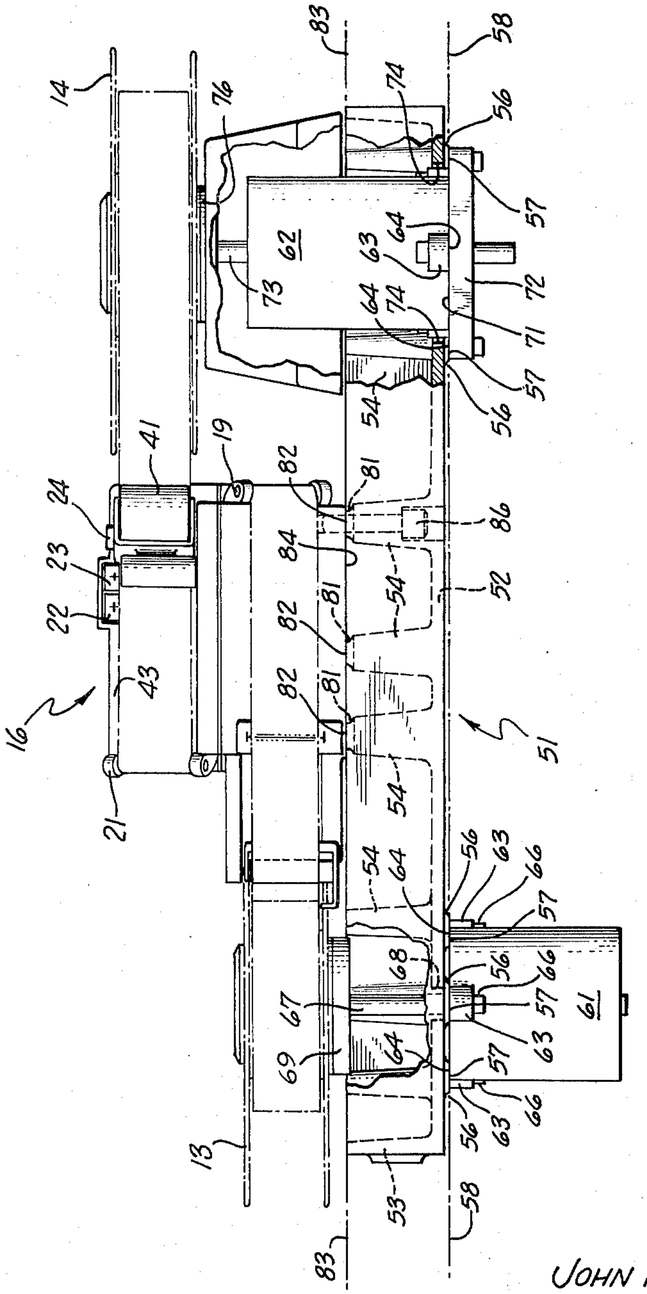
FIGURE 4 is a front elevation of a portion of the apparatus shown in FIGURES 1–3.

It will be readily seen that every element that engages the tape is mounted directly on the scanning assembly 16, except the reels 13, 14. In order to solidly journal and mount the reels with respect to the scanning assembly, so that the axes of the reels are strictly parallel to the axis of the scanning assembly, and so that the reels are correctly positioned precisely at the lower and upper levels as previously described, there is provided a mounting plate 51 as shown in FIGURE 4. This figure shows all of the solidly coupled mounting elements together with the scanning assembly, reels and reel motors, separate from the chassis 50 including the decorative top plate 26 that is shown in FIGURES 1–3.

The mounting plate 51 is formed as a substantially flat planar web 52 stiffened and reinforced by side flanges 53 and interior flanges 54; and the plate is formed in a unitary piece as by standard casting methods. The plate is positioned with the web 52 at the bottom, and with a number of bosses 56 projecting downwardly from the web at points that are solidly reinforced at the other side of the web 52 by the presence of various of the flanges 54. All of the bosses 56 are machined to present downwardly facing reference surfaces 57 all conforming to a predetermined reference plane 58, for the accurate mounting of the supply reel motor 61 and the take-up reel motor 62.

For such mounting, the supply reel motor 61 has three radially extending ears 63 substantially equi-spaced circumferentially around the axis of the motor at one end of the motor, and presenting three planar mounting surfaces 64 all conforming to the same plane normal to the axis of the motor. The motor 61 is then mounted as by means of bolts 66 with the mounting surfaces 64 flatly and solidly engaging the corresponding reference surfaces 57, and so that the shaft 67 of the motor extends precisely perpendicular to the reference plane 58. The shaft 67 passes through a first aperture 68 in the web 52 of the mounting plate and upwardly to the first tape level, where the supply reel turntable 69 is secured to the shaft for the mounting of the supply reel 13.

The mounting of the takeup reel motor 62 differs slightly. The motor 62 has, like the motor 61, a plurality of radially extending ears 63 at one end, presenting mounting surfaces 64, but the motor 62 is mounted with the ear-bearing end downward, and with the mounting surfaces 64 flatly engaging a planar surface 71 of a reference plate 72, which extends radially beyond the periphery defined by the ears 63. The plate 72 is then mounted with the surface 71 flatly engaging at least three of the bosses 56 so as to conform to the reference plane 58, and with the shaft 73 of the motor 62 precisely perpendicular to the reference plane 58. In this mounting arrangement, it will be seen that in order to take best advantage of the space available, the motor 62 and shaft 73 both extend upwardly from the mounting plate 51, passing through a second aperture 74 in the web 52. The shaft 73 extends to the upper tape level where the takeup reel turntable 76 is mounted on the shaft 73 for the mounting of the takeup reel 14.

It will be seen that the above-described arrangement ensures the parallel alignment of the supply and takeup motor shafts 67 and 73. In order to ensure the mutual parallelism of these shafts with the axis of the scanning assembly, the plate 51 is provided with at least three bosses 81 at the upper side of the plate, spaced in a triangular relationship and presenting upwardly facing reference surfaces 82 that conform to a second reference plane 83 that is parallel to the reference plane 58. The bosses 81 are all formed on portions of interior flanges 54 previously described. The scanning assembly has a bottom surface 84 that is precisely normal to the axis of the scanning assembly, and the assembly is mounted with the surface 84 flatly engaging the three surfaces 82 of the plate 51, and is secured thereto as by means of bolts 86 extending through the flanges 54 and into the scanning assembly 16.

Thus there has been described a transport in accordance with the invention utilizing a massive helical scanning assembly on which all of the tape engaging elements are solidly mounted in such a way that they all bear radially outwardly from the scanning assembly against the same side of the tape, with the exception of the pinch roller, which must engage the tape opposite the capstan. Although only one capstan is used, engaging only one portion of the tape, the shanks of the tape in the bend are crossed to define a loop, this configuration being essential to enable the engagement of all the guide elements with only one side of the tape. In addition the reels are mounted, by means of a novel top plate, in strict parallelism with the axis of the scanning assembly.

What is claimed is:

1. In a tape transport of the class in which the tape is guided in a bend between a pair of reels, the combination comprising:

a mounting member positioned at least partly within said bend so as to confront substantially the entire concave side of said tape in said bend; and a plurality of tape-engaging and guiding elements and a capstan engaging said concave side of said tape in said bend;

each of said elements and said capstan engaging only one portion of the length of said tape; and all of said elements being mounted on said mounting member, extending directly between the confronting portions of said tape in said bend and said mounting member, and bearing outwardly therefrom against the same side of said tape.

2. In a tape transport of the class in which the tape is guided in a bend between a pair of reels, the combination comprising:

a mounting member positioned at least partly within said bend so as to confront substantially the entire concave side of said tape in said bend;

a plurality of tape-engaging and guiding elements and a capstan engaging said concave side of said tape in said bend;

each of said elements and said capstan engaging only one portion of the length of said tape;

all of said elements being mounted on said mounting member, extending directly between the confronting portions of said tape in said bend and said mounting member, and bearing outwardly therefrom against the same side of said tape; and a pinch roller for said capstan, said pinch roller being mounted on an extension of said mounting member and bearing against the other side of said tape opposite said capstan.

3. In a tape transport of the class in which the tape is guided in a bend between a pair of reels, the combination comprising:

a mounting member positioned at least partly within said bend so as to confront substantially the entire concave side of said tape in said bend;

a plurality of tape-engaging and guiding elements and a capstan engaging said concave side of said tape in said bend;

each of said elements and said capstan engaging only one portion of the length of said tape;

all of said elements being mounted on said mounting member, extending directly between the confronting portions of said tape in said bend and said mounting member, and bearing outwardly therefrom against the same side of said tape; and the shanks of said tape between said bend and said reels being crossed over one another to define a loop including said bend.

4. In a tape transport of the class in which the tape is guided in a bend between a pair of reels, the combination comprising:

a mounting and tape guiding member positioned at least partly within said bend so as to confront substantialy the entire concave side of said tape in said bend;

said mounting and guiding member being provided with a substantially semi-cylindrical surface for guiding said tape in said bend;

a plurality of tape-engaging and guiding elements and a capstan engaging said concave side of said tape in said bend;

each of said elements and said capstan engaging only one portion of the length of said tape;

all of said elements being mounted on said mounting member, extending directly between the confronting portions of said tape in said bend and said mounting member, and bearing outwardly therefrom against the same side of said tape; and said tape being guided in a helical half turn around said semi-cylindrical surface, the shanks of said tape between said surface and said reels being crossed over one another to define a loop including said bend.

5. In a broad band magnetic tape transport of the class in which the tape is guided in a bend including a helical half-turn around a scanning assembly located between a pair of reels, the combination comprising:

a plurality of tape-engaging and guiding elements and a capstan engaging said concave side of said tape in said bend;

each of said elements and said capstan engaging only one portion of the length of said tape;

all of said elements being mounted on said scanning assembly, extending directly between the confronting portions of said tape in said bend and said scanning assembly, and bearing outwardly therefrom against the same side of said tape; and the shanks of said tape between said scanning assembly and said reels being crossed over one another to define a loop including said helical halfturn.

6. In a broad band magnetic tape transport of the class in which the tape is guided in a bend including a helical half-turn around a scanning assembly located between a pair of reels, the combination comprising:

a capstan and a plurality of tape-engaging and guiding elements including a pivotable tension arm, a pair of angled guide posts, and a plurality of stationary magnetic transducing heads;

each of said elements and said capstan engaging only one portion of the length of said tape;

all of said elements being mounted on said scanning assembly, extending directly between the confronting portions of said tape in said bend and said scanning assembly, and bearing outwardly therefrom against the same side of said tape; and the shanks of said tape between said scanning assembly and said reels being crossed over one another to define a loop including said helical halfturn.

7. In a broad band magnetic tape transport of the class in which the tape is guided in a helical half-turn around a scanning assembly located between a pair of reels, the combination comprising:

a plurality of tape-engaging elements including a capstan, a pivotable tension arm, a pair of angled guide posts, and a plurality of stationary magnetic transducing heads;

said scanning assembly being formed as a massive member presenting a substantially semicylindrical tape guiding surface on one side and a stepped configuration on the other side defining upper and lower level walls generally parallel to the axis of said semi-cylindrical surface, said lower level wall being offset from said upper level wall in a direction radially away from said axis, and an upper level platform surface normal to said axis and extending between said walls;

said tape being guided from one of said reels in the plane of said lower level, thence around said lower level wall, thence at an upward angle and in said helical half-turn around said semi-cylindrical surface to said upper level wall, thence along said upper level wall and above said platform surface and to the other of said reels at said upper level, said tape at said upper level between said scanning assembly and said other reel being arranged to cross the adjacent portion of tape of said lower level to define a loop;

all of said elements being mounted on said scanning assembly and bearing outwardly therefrom against the same side of said tape; and each of said elements engaging only one portion of the length of said tape.

8. In a broad band magnetic tape transport of the class in which the tape is guided in a helical half-turn around a scanning assembly located between a pair of reels, the combination comprising:

a plurality of tape-engaging elements including a capstan, a pivotable tension arm, a pair of angled guide posts, and a plurality of stationary magnetic transducing heads;

each of said tape-engaging elements engaging only one portion of the length of said tape;

all of said tape-engaging elements being mounted on said scanning assembly and bearing outwardly therefrom against the same side of said tape;

said scanning assembly being formed as a massive member presenting a substantially semi-cylindrical tape guiding surface on one side and a stepped configuration on the other side defining upper and lower level walls generally parallel to the axis of said semi-cylindrical surface, said lower level wall being offset from said upper level wall in a direction radially away from said axis, and an upper level platform surface normal to said axis and extending between said walls;

said reels being mounted in spaced relation to said scanning assembly and at said upper and lower levels respectively and axially parallel to said axis of said semi-cylindrical surface and positioned so that all of the bends of said tape induced by said tape-engaging elements between said reels define interior angles on said same side of said tape; and said tape being guided from one of said reels in the plane of said lower level, thence around said lower level wall, thence at an upward angle and in said helical half-turn around said semi-cylindrical surface to said upper level wall, thence along said upper level wall and above said platform surface and to the other of said reels at said upper level, said tape at said upper level between said scanning assembly and said other reel being arranged to cross the adjacent portion of tape of said lower level to define a loop.

9. In a broad band magnetic tape transport of the class in which the tape is guided in a helical half-turn around a scanning assembly located between a pair of reels, the combination comprising:

a plurality of tape-engaging elements including a capstan, a pivotable tension arm, a pair of angled guide posts, and a plurality of stationary magnetic transducing heads;

each of said tape-engaging elements engaging only one portion of the length of said tape;

all of said tape-engaging elements being mounted on said scanning assembly and bearing outwardly therefrom against the same side of said tape;

said scanning assembly being formed as a massive member presenting a substantially semi-cylindrical tape guiding surface on one side and a stepped configuration on the other side defining upper and lower level walls generally parallel to the axis of said semi-cylindrical surface, said lower level wall being offset from said upper level wall in a direction radially away from said axis, and an upper level platform surface normal to said axis and extending between said walls;

said reels being mounted in spaced relation to said scanning assembly and at said upper and lower levels respectively and axially parallel to said axis of said semi-cylindrical surface and positioned so that all of the bends of said tape induced by said tape-engaging elements between said reels define interior angles on said same side of said tape;

said tape being guided from one of said reels in the plane of said lower level, thence around said lower level wall, thence at an upward angle and in said helical half-turn around said semi-cylindrical surface to said upper level wall, thence along said upper level wall and above said platform surface and to the other of said reels at said upper level, said tape at said upper level between said scanning assembly and said other reel being arranged to cross the adjacent portion of tape of said lower level to define a loop;

said tension arm being mounted at said lower level and engaging said tape between said one reel and said scanning assembly;

one of said heads, namely an erase head, being mounted at said lower level and at the upstream end of said lower level wall with the length thereof solidly supported by said lower level wall, one of said angled guide posts being mounted at the downstream end of said lower level wall with the length thereof solidly supported by said lower level wall;

the other of said guide posts being mounted at the upstream end of said upper level wall with the length thereof solidly supported by said upper level wall;

the other of said transducing heads being mounted in said upper level wall with the lengths thereof solidly supported by said upper level wall;

said capstan being mounted to project above said platform surface at the downstream end of said upper level wall; and a pinch roller mounted on said platform surface and engaging said tape on the side opposite said capstan.

10. In a tape transport of the class in which the tape is guided in a bend between a pair of reels, the combination comprising:

a mounting member positioned at least partly within said bend so as to confront substantially the entire concave side of said tape in said band;

a plurality of tape-engaging and guiding elements and a capstan engaging said concave side of said tape in said bend;

each of said elements and said capstan engaging only one portion of the length of said tape;

all of said elements being mounted on said mounting member, extending directly between the confronting portions of said tape in said bend and said mounting member, and bearing outwardly therefrom against the same side of said tape;

a mounting plate provided with at least one reference surface conforming to a predetermined reference plane; and means for mounting said reels and said mounting member on said plate in predetermined angular relationship to said reference plane.

11. In a tape transport of the class in which the tape is guided in a bend between a pair of reels, the combination comprising:

a mounting member positioned at least partly within said bend so as to confront susbtantially the entire concave side of said tape in said bend;

a plurality of tape-engaging and guiding elements and a capstan engaging said concave side of said tape in said bend;

each of said elements and said capstan engaging only one portion of the length of said tape;

all of said elements being monuted on said mounting member, extending directly between the confronting portions of said tape in said bend and said mounting member, and bearing outwardly therefrom against the same side of said tape;

a mounting plate provided with a plurality of reference surfaces each conforming to one of a pair of parallel reference planes; and means for mounting said reels and said mounting member on said plate reference surfaces in predetermined angular relationship to said reference planes.

12. In a tape transport of the class in which the tape is guided in a bend between a pair of reels, the combination comprising:

a mounting member positioned at least partly within said bend so as to confront substantially the entire concave side of said tape in said bend;

a plurality of tape-engaging and guiding elements and a capstan engaging said concave side of said tape in said bend;

each of said elements and said capstan engaging only one portion of the length of said tape;

all of said elements being mounted on said mounting member, extending directly between the confronting portions of said tape in said bend and said mounting member, and bearing outwardly therefrom against the same side of said tape;

a mounting plate provided with a plurality of reference surfaces each conforming to one of a pair of parallel reference planes;

each of said reels being mounted on the shaft of a respective motor;

each of said motors being mounted on at least one of said reference surfaces conforming to one of said reference planes with said shaft of said motor perpendicular to said one reference plane; and said mounting member being mounted on at least one other of said reference surfaces conforming to the other of said reference planes.

13. In a tape transport of the class in which the tape is guided in a bend between a pair of reels, the combination comprising:

a mounting member positioned at least partly within said bend;

a plurality of tape-engaging elements including a capstan;

each of said elements engaging only one portion of the length of said tape;

all of said elements being mounted on said mounting member and bearing outwardly therefrom against the same side of said tape;

a mounting plate provided with a plurality of reference surfaces each conforming to one of a pair of parallel reference planes;

each of said reels being mounted on the shaft of a respective motor;

each of said motors having at least one radial extension at one end defining a planar mounting surface normal to the shaft of said motor;

one of said motors being mounted on said mounting plate with said mounting surface thereof flatly engaging one of said reference surfaces conforming to one of said reference planes, and with said shaft extending from said one end of said motor, said mounting plate being provided with a first aperture for passage of said shaft therethrough;

a reference plate mounted on said radial extensions of the other of said motors, said reference plate having a planar surface flatly engaging said planar mounting surfaces of said other motor and extending radially outwardly of said radial extensions thereof;

said reference plate being mounted on said mounting plate with said planar surface of said reference plate flatly engaging at least one of said reference surfaces conforming to said one reference plane, and with said other motor and the shaft thereof extending in the same direction as the shaft of said one motor, said mounting plate being provided with a second aperture for passage of said other motor therethrough; and said mounting member being mounted on at least one other of said reference surfaces conforming to the other of said reference planes.

14. In a broad band magnetic tape transport of the class in which the tape is guided in a helical half-turn around a scanning assembly located between a pair of reels, the combination comprising:

a plurality of tape-engaging elements including a capstan, a pivotable tension arm, a pair of angled guide posts, and a plurality of stationary magnetic transducing heads;

each of said tape-engaging elements engaging only one portion of the length of said tape;

all of said tape-engaging elements being mounted on said scanning assembly and bearing outwardly therefrom against the same side of said tape;

said scanning assembly being formed as a massive member presenting a substantially semi-cylindrical tape guiding surface on one side and a stepped configuration on the other side defining upper and lower level walls generally parallel to the axis of said semi-cylindrical surface, said lower level wall being offset from said upper level wall in a direction radially away from said axis, and an upper level platform surface normal to said axis and extending between said walls;

a mounting plate provided with a plurality of reference surfaces each conforming to one of a pair of parallel reference planes;

each of said reels being mounted on the shaft of a respective motor;

each of said motors having at least one radial extension at one end defining a planar mounting surface normal to the shaft of said motor;

one of said motors being mounted on said mounting plate with said mounting surface thereof flatly engaging one of said reference surfaces conforming to one of said reference planes, and with said shaft extending from said one end of said motor, said mounting plate being provided with a first aperture for passage of said shaft therethrough;

a reference plate mounted on said radial extensions of the other of said motors, said reference plate having a planar surface flatly engaging said planar mounting surfaces of said other motor and extending radially outwardly of said radial extensions thereof;

said reference plate being mounted on said mounting plate with said planar surface of said reference plate flatly engaging at least one of said reference surfaces conforming to said one reference plane, and with said other motor and the shaft thereof extending in the same direction as the shaft of said one motor, said mounting plate being provided with a second aperture for passage of said other motor therethrough;

said scanning assembly being mounted on at least one other of said reference surfaces conforming to the other of said reference planes and extending in the same direction as said motor shafts with said axis of said semi-cylindrical surface normal to said other reference plane;

said reel of said one motor being positioned on said shaft thereof in the plane of said lower level;

said reel of said other motor being positioned on said shaft thereof in the plane of said upper level;

said tape being guided from said reel in the plane of said lower level, thence around said lower level wall, thence at an upward angle and in said helical half-turn around said semi-cylindrical surface to said upper level wall, thence along said upper level wall and above said platform surface and to the other of said reels at said upper level, said tape at said upper level between said scanning assembly and said other reel being arranged to cross the adjacent portion of tape of said lower level to define a loop, and said motors and reels being further positioned so that all of the bends of said tape induced by said tape-engaging elements between said reels define interior angles on said same side of said tape;

said tension arm being mounted at said lower level and engaging said tape between said one reel and said scanning assembly;

one of said heads, namely an erase head, being mounted at said lower level and at the upstream end of said lower level wall with the length thereof solidly supported by said lower level wall;

one of said angled guide posts being mounted at the downstream end of said lower level wall with the length thereof solidly supported by said lower level wall;

the other of said guide posts being mounted at the upstream end of said upper level wall with the length thereof solidly supported by said upper level wall;

the other of said transducing heads being mounted in said upper level wall with the lengths thereof solidly supported by said upper level wall;

said capstan being mounted to project above said platform surface at the downstream end of said upper level wall; and a pinch roller mounted on said platform surface and engaging said tape on the side opposite said capstan.

References Cited by the Examiner

UNITED STATES PATENTS

| | | | |
|---|---|---|---|
| 3,065,355 | 11/1962 | Barnes | 242—55.12 X |
| 3,114,513 | 12/1963 | Yasuda et al. | 242—55.12 |
| 3,145,942 | 8/1964 | Luckey et al. | 242—55.12 |

MERVIN STEIN, *Primary Examiner.*

L. D. CHRISTIAN, *Assistant Examiner.*